United States Patent [19]

Sanders

[11] Patent Number: 4,738,906
[45] Date of Patent: Apr. 19, 1988

[54] STORAGE BATTERY HEATING AND HEAT MAINTENANCE APPARATUS

[75] Inventor: Ronald J. Sanders, Anoka, Minn.

[73] Assignee: Weather Ready Inc., Fridley, Minn.

[21] Appl. No.: 884,993

[22] Filed: Jul. 14, 1986

Related U.S. Application Data

[63] Continuation-in-part of Ser. No. 728,792, Apr. 30, 1985, Pat. No. 4,600,665, which is a continuation-in-part of Ser. No. 642,580, Aug. 20, 1984, abandoned.

[51] Int. Cl.$^4$ ............................................. H01M 10/50
[52] U.S. Cl. .................................... 429/120; 180/68.5; 429/122; 429/100
[58] Field of Search ................. 429/120, 163, 62, 122, 429/100, 99; 180/68.5

[56] References Cited

U.S. PATENT DOCUMENTS

| | | | |
|---|---|---|---|
| 2,104,770 | 1/1938 | Saunders | 180/68.5 |
| 2,707,721 | 5/1955 | Anderson et al. | 429/100 |
| 3,146,132 | 8/1964 | Nathan | 429/100 |
| 3,309,234 | 3/1967 | Rundles | 429/62 |

FOREIGN PATENT DOCUMENTS

| | | | |
|---|---|---|---|
| 0569756 | 6/1945 | United Kingdom | 429/120 |
| 0894555 | 4/1962 | United Kingdom | 429/62 |

*Primary Examiner*—Donald L. Walton
*Attorney, Agent, or Firm*—Peterson, Wicks, Nemer & Kamrath

[57] ABSTRACT

Apparatus for heating and for maintaining temperatures in storage batteries is shown in the preferred forms of the present invention as including a T-shaped insulation blanket, a thermal cap, a thermally insulating mat, and a battery heater. The battery heater is secured to the battery by generally Z-shaped hangers and a securement strap and includes a heat exchanger connected to the cooling system of the vehicle. The heat exchanger is enclosed by a back cover telescopically received in a unit base. Ribs on the back cover and unit base create air buffers to reduce heat transfer to the battery. The thermally insulating mat is formed of a sheet having integral ribs and is of a size smaller than the bottom of the battery such that the bottom edges of the battery trap air between the ribs and beneath the storage battery to form an air barrier. The head of the T-shaped insulation blanket is held in a wrapped condition around the faces of the storage battery and the leg of the T-shaped insulation blanket extends over the top of the battery and has its free end located beneath the head of the T-shaped insulation blanket. The thermal cap covers the top of the storage battery and extends down the faces of the storage battery beneath the head of the insulation blanket in a wrapped condition around the faces of the battery.

27 Claims, 2 Drawing Sheets

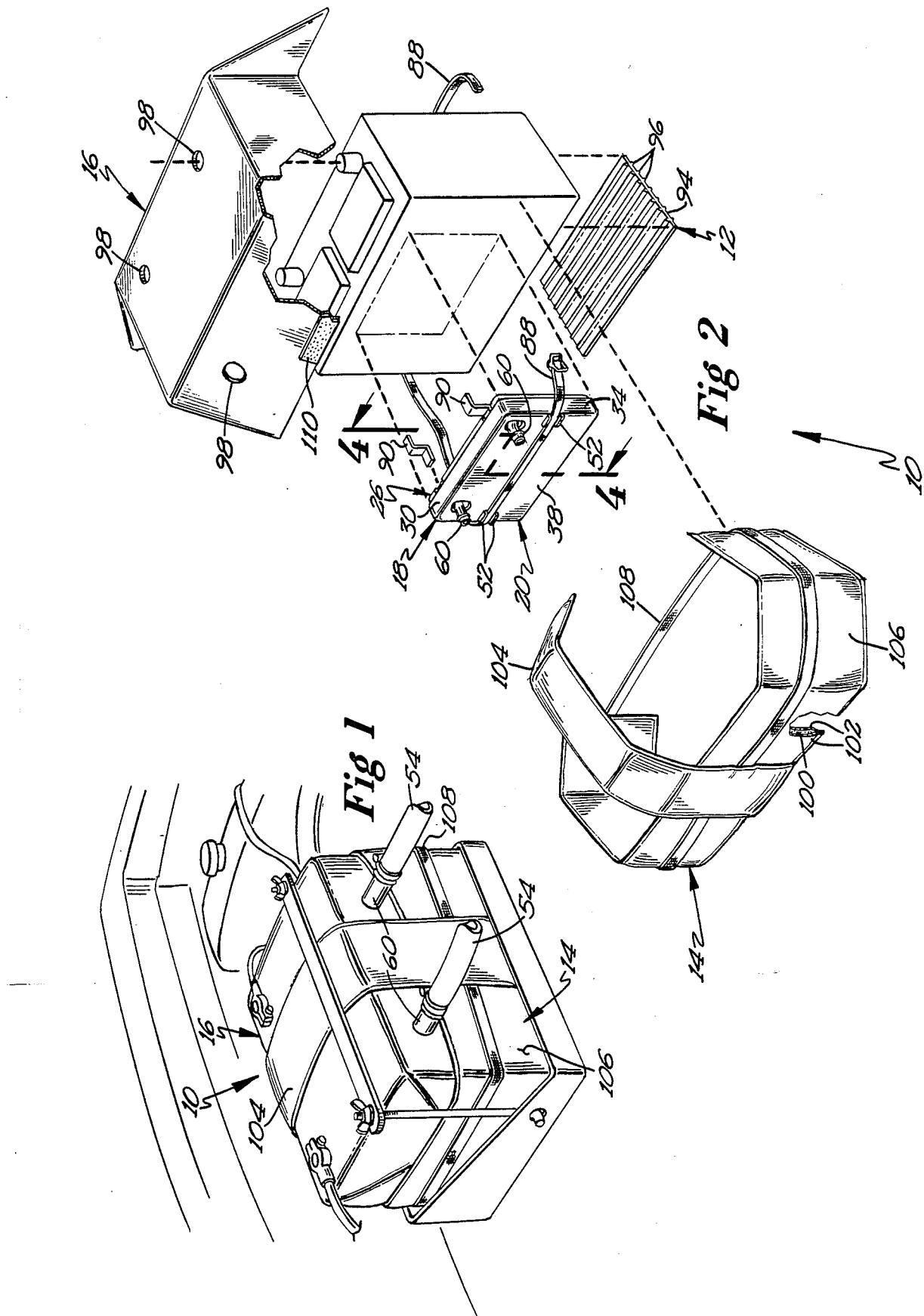

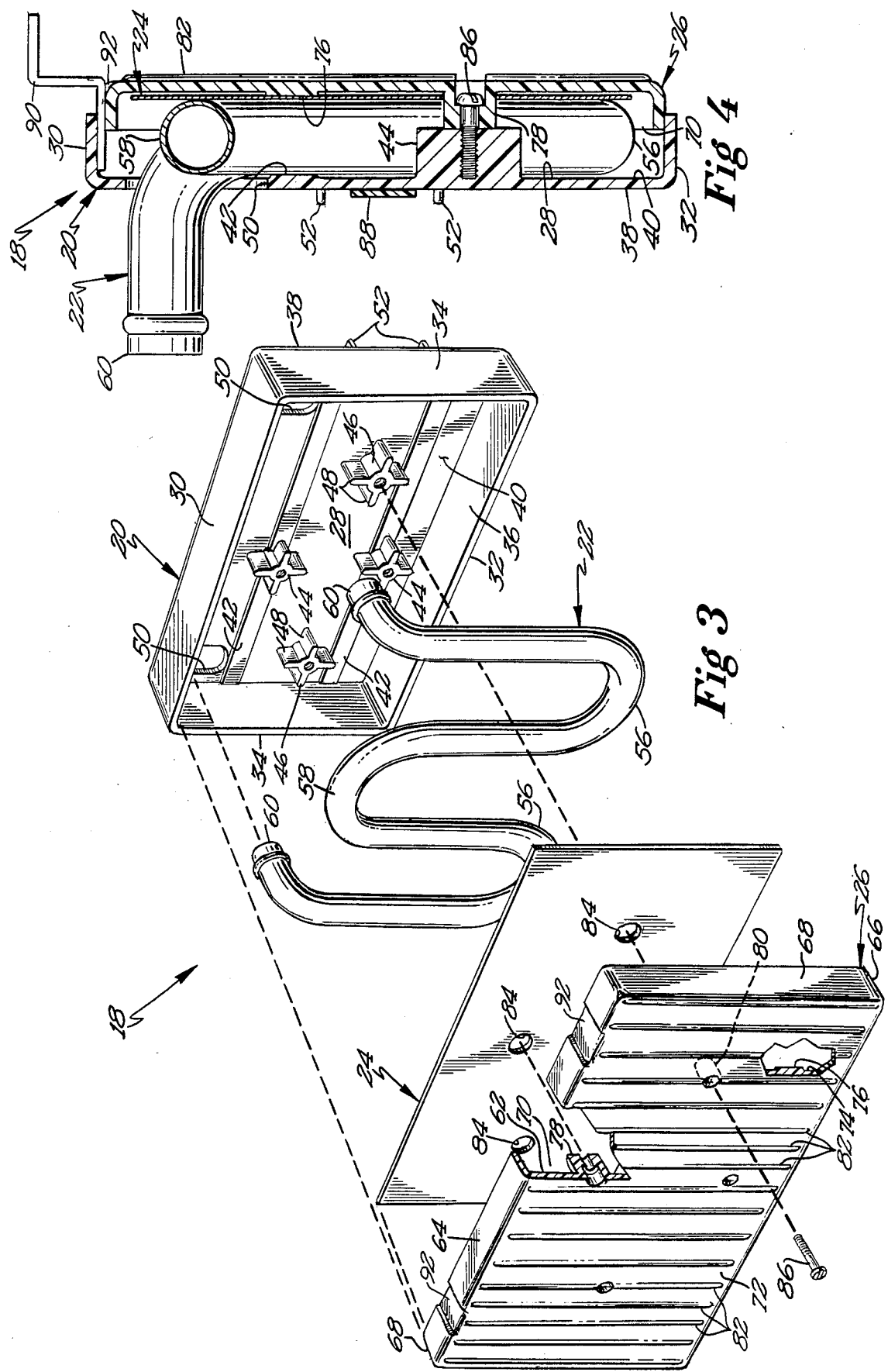

STORAGE BATTERY HEATING AND HEAT MAINTENANCE APPARATUS

CROSS REFERENCE TO RELATED APPLICATIONS

This application is a continuation-in-part of my earlier filed pending application, Ser. No. 728,792, filed on Apr. 30, 1985, now U.S. Pat. No. 4,600,665 which in turn is a continuation-in-part application of application Ser. No. 642,580, filed Aug. 20, 1984, which is now abandoned.

BACKGROUND

The present invention relates generally to heating and heat maintenance apparatus for storage batteries, and, in particular, to an improved apparatus for heating and for maintaining temperatures in such storage batteries in high efficiency operating ranges regardless of extremely low ambient air temperatures.

As is well known in the automotive art, internal combustion engines, particularly diesels, are extremely hard to start in colder climates, such as the northern United States of America, during the winter months. This is due primarily to a combination of three factors precipitated by the cold weather. They are, the extreme thickening of engine lubricants, the lessened volatility of fuel mixtures, and the reduced cranking power of engine-starter storage batteries.

The design of a storage battery allows it to store the heat required for maximum output of cold cranking amps. In severe cold and especially in prolonged subzero temperatures a natural heat loss takes place and that is when the alternator, by itself, which is limited in its delivery of adequate compensation, cannot in the process of charging the battery deliver the necessary heat energy to maintain the battery's cranking capacity. It is well documented in the storage battery art that the reserve capacity, or cranking power of lead-acid storage batteries is reduced substantially by lower temperatures This drop is roughly 0.64% per degree Fahrenheit in the range of about 90° F. to about −30° F. or roughly 0.36% per degree Centigrade in the range of about 32° C. to about −34° C.

There have been many attempts to solve cold weather starting problems by engine "add-on" devices. The most common example of such an "add-on" device is the type of electric heater which heats various parts of the engine, oil, and fuel. Such electric heater units must be plugged into outlets continuously to be effective. Some electric warmers are also available for batteries. All of these plug-in heaters convert high grade energy into low grade heat and they cannot function if external electrical power is not available.

Other types of temperature-sustaining apparatus known in the storage-battery art require complex siphoning systems as taught by U.S. Pat. No. 2,399,942 to M. Resek, or relatively expensive systems having insulated containers, thermal regulation valves and related components as taught by U.S. Pat. No. 3,110,633 to W. D. Bachmann. Such systems have the further drawback of being extremely difficult to retrofit onto a vehicle having a standard factory-installed cooling system.

The present invention avoids the problems and complexities inherent in the aforedescribed prior art, and provides a novel and improved storage battery apparatus which maintains high efficiency and is easily adapted or retrofitted to vehicles having a system for circulating liquid coolant. Further, the present invention is compatible with existing devices, such as conventional tank heating equipment. It is also recognized that the present invention increases battery charging efficiency and, therefore, use of the present invention may result in the additional benefit of increased gas mileage.

SUMMARY

The present invention solves these problems and needs of the prior art by providing, in a first preferred aspect of the present invention, an apparatus for maintaining heat in storage batteries in the form of a T-shaped insulation blanket, with the head of the T-shaped insulation blanket being held in a wrapped condition around the faces of the storage battery and the leg of the T-shaped insulation blanket extending over the top of the battery intermediate the terminals and having its free end located beneath the head of the T-shaped insulation blanket.

In another preferred aspect of the present invention, the storage battery heat maintenance apparatus includes a thermal cap covering the top of the storage battery and extending down the faces of the storage battery beneath the head of the insulation blanket in a wrapped condition around the faces of the storage battery.

In a further preferred aspect of the present invention, the storage battery heat maintenance apparatus is provided in the form of a thermally insulating mat, with the thermally insulating mat being formed of a sheet having integral ribs and being of a size smaller than the bottom of the storage battery such that the bottom edges of the storage battery trap air between the ribs and beneath the storage battery to form an air barrier.

In a still further preferred aspect of the present invention, an apparatus for heating storage batteries is provided in the form of a battery heater removably secured to a face of the storage battery. In the preferred form, the battery heater includes a heat applying member interconnected to the liquid cooling system of an automotive-type vehicle and provisions for reducing the heat transfer of the heat applying member from the temperature of the liquid cooling system.

It is thus an object of the present invention to provide a novel heating apparatus for storage batteries.

It is thus an object of the present invention to provide a novel heat maintenance apparatus for storage batteries.

It is further an object of the present invention to provide such a novel storage battery heating and heat maintenance apparatus which requires no external power source.

It is further an object of the present invention to provide such a novel storage battery heating and heat maintenance apparatus which may be easily and rapidly installed in retrofit environments.

It is further an object of the present invention to provide such a novel storage battery heating and heat maintenance apparatus which is adapted to universally fit various sizes and varieties of storage batteries.

It is further an object of the present invention to provide such a novel storage battery heating and heat maintenance apparatus which maintains high battery efficiency operating ranges.

It is further an object of the present invention to provide such a novel storage battery heating and heat maintenance apparatus which may increase battery charging efficiency.

It is further an object of the present invention to provide such a novel storage battery heating and heat maintenance apparatus which requires no daily maintenance.

It is further an object of the present invention to provide such a novel storage battery heating and heat maintenance apparatus which is economically adaptable for consumer automotive-type vehicles.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of a preferred form of a heating and heat maintenance apparatus according to the teachings of the present invention in use on a storage battery of an automotive-type vehicle.

FIG. 2 shows an exploded, perspective view of the storage battery heating and heat maintenance apparatus of FIG. 1.

FIG. 3 shows an exploded, perspective view of the storage battery heating and heat maintenance apparatus of FIG. 1.

FIG. 4 shows a cross sectional view of the storage battery heating and heat maintenance apparatus of FIG. 1 according to section line 4—4 of FIG. 2.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

Storage battery heating and heat maintenance apparatus according to the preferred teachings of the present invention is shown in the drawings and generally designated 10. Apparatus 10 in the most preferred form includes a thermally insulating mat 12, an insulation blanket 14, a thermal cap 16, and a battery heater 18. It should be noted that apparatus 10 in its most preferred form may include a battery terminal heater of the type shown and described in application Ser. No. 728,792 filed Apr. 30, 1985, now U.S. Pat. No. 4,600,665, which is incorporated herein by reference.

In its most preferred form, battery heater 18 includes a unit base 20, a heat exchanger 22, a spreader plate 24, and a back cover 26. Unit base 20 in its preferred form is box-shaped having an enlarged, closed bottom 28, a closed top edge 30, a closed bottom edge 32, closed side edges 34, and an open top 36. Bottom 28 includes an outside surface 38 and a inside surface 40 defining a thickness in the range of 0.08 inches (0.20 cm). Inside surface 40 includes first and second, parallel, spaced, upstanding, integral ribs 42 having a height above surface 40 in the range of 0.04 inches (0.10 cm). First and second studs 44 upstand from first and second ribs 42, respectively, generally intermediate side edges 34 and third and fourth studs 46 upstand from surface 40 on opposite sides of studs 44, intermediate ribs 42, and intermediate studs 44 and side edges 34. Studs 44 and 46 extend above surface 40 to a height less than edges 30, 32, and 34 and specifically in the range of 0.375 inches (0.953 cm). In the most preferred form, studs 44 and 46 include four radially extending flanges 48 spaced 90° around studs 44 and 46. Openings 50 are further provided in bottom 28 adjacent to the corners of top edge 30 and side edges 34. In the most preferred form, openings 50 are generally elongated, oval-shaped and particularly have the shape of two semi-circular portions interconnected by a rectangular portion. Spaced, horizontally oriented flanges 52 are provided upstanding from outside surface 38 of bottom 28 of unit base 20.

Heat exchanger 22 in the most preferred embodiment of the present invention is a heating coil for connection to a liquid cooling system 54 of an automotive-type vehicle allowing circulation of the liquid coolant of the liquid cooling system 54 therethrough. In the preferred form, heat exchanger 22 is a conduit formed of material capable of suitably conducting heat through surface contact such as brass-copper and having a generally W configuration. Specifically, heat exchanger 22 includes first and second U-shaped members 56 which straddle studs 46 and having their second ends interconnected by an arcuate portion 58 which with the legs of U-shaped members 56 form an inverted U which straddles studs 44. The first ends of U-shaped members 56 are in fluid communication with connectors 60 which can be connected to liquid cooling system 54 of an automotive-type vehicle. It can then be realized that heat exchanger 22 may be positioned in unit base 20 with connectors 60 extending through openings 50 of bottom 28. It can then be appreciated that flanges 48 of studs 44 and 46 help in positioning heat exchanger 22 in unit base 20. Likewise, the preferred shape of openings 50 allow for vertical adjustment in the placement of heat exchanger 22 in unit base 20. Further, ribs 42 hold heat exchanger 22 in a spaced condition from surface 40 of bottom 28 of unit base 22.

Back cover 26 in its preferred form is box-shaped having an enlarged, closed bottom 62, a closed top edge 64, a closed bottom edge 66, closed side edges 68, and an open top 70. Bottom 62 includes an outside surface 72 and an inside surface 74 defining a thickness in the range of 0.08 inches (0.20 cm). Inside surface 74 includes first and second, parallel, spaced, upstanding, integral ribs 76 having a height above surface 74 in the range of 0.02 inches (0.05 cm). First and second studs 78 upstand from first and second ribs 76, respectively, generally intermediate side edges 68 and third and fourth studs 80 upstand from surface 74 on opposite sides of studs 78, intermediate ribs 76, and intermediate studs 78 and side edges 68. Studs 78 and 80 extend above surface 74 to a height generally equal to the height of edges 64, 66, and 68 and specifically in the range of 0.302 inches (0.767 cm). Spaced, vertically oriented ribs 82 are provided upstanding from outside surface 72 of bottom 62 of back cover 26.

In the most preferred form, back cover 26 has a shape for telescopic receipt within unit base 20 and specifically edges 64, 66, and 68 of back cover 26 have a shape complementary to and for slidable receipt in edges 28, 30, and 34, respectively. Studs 78 and 80 of back cover 26 are in alignment with studs 44 and 46 of unit base 20, respectively, when back cover 26 is received within base unit 20. In the preferred embodiment, unit base 20 and back cover 26 are formed of material having excellent thermal holding ability which will still allow a slow radiation of heat which it will as well quickly absorb and in its most preferred form is formed of black, 30% glass filled polypropylene, with the glass fill allowing better heat transfer than homogeneous polypropylene.

Spreader plate 24 is formed of material permitting relatively good thermal conductivity and which will quickly absorb heat, conduct heat over its entire area, and radiate heat over its entire area and in its most preferred form is formed of brass having a thickness in the range of 0.032 inches (0.081 cm). Plate 24 includes openings 84 complementary to and for slidable receipt on studs 78 and 80 of back cover 26. Plate 24 has a size and shape for receipt through top 70 of back cover 26 and for placement adjacent to surface 74 of bottom 62. Ribs 76 hold spreader plate 24 in a spaced condition from surface 74 of bottom 62 of back cover 26.

In assembling battery heater 18, spreader plate 24 may be positioned in back cover 26 and heat exchanger 22 may be positioned in unit base 20. Back cover 26 may then be telescopically received into unit base 20 such that heat exchanger 22 and spreader plate 24 are in direct, heat conductive contact and are sandwiched between ribs 42 and 76 of unit base 20 and back cover 26. The preferred shape of openings 50 insure that heat exchanger 22 can rest flush against spreader plate 24 and does not bind in openings 50 extending through bottom 28. In the preferred form, studs 44 and 46 of unit base 20 abut with studs 78 and 80 of back cover 26, respectively. Back cover 26 may be secured to unit base 20 by any suitable means 86 such as plastic screws extending through studs 78 and 80 into studs 44 and 46. Further, flanges 48 give added strength to studs 44 and 46 such that bottom 62 of back cover 26 is pulled toward bottom 28 of unit base 20 to insure that heat exchanger 22 is pulled snugly against spreader plate 24 and establishes a thermal conductivity path therebetween.

Suitable means may be provided to removably secure battery heater 18 to the storage battery. Specifically, in its most preferred form, securement strap 88 is provided to extend around the storage battery and battery heater 18 with ribs 82 of surface 72 abutting with a side of the storage battery. In the most preferred form, strap 88 is located between flanges 52 of surface 38 of unit base 20 of battery heater 18. Further, in its most preferred form, hangers 90 are provided having a generally Z shape. Top edge 64 of back cover 26 include notches 92 allowing the first ends of hangers 90 to be received in notches 92 between top edges 30 and 64 of unit base 20 and back cover 26. The other end of hangers 90 may be positioned to rest on the top of the storage battery. Thus hangers 90 prevent battery heater 18 from sliding down the face of the storage battery. In its most preferred form, surface 72 has a length of 7 inches (17.78 cm) and a height of 5 inches (12.7 cm) and therefore is able to abut on any of the four sides of a standard, automotive-type storage battery, as different sides of the storage battery will be exposed depending upon the battery platform arrangement to allow securement of battery heater 18 thereto according to the teachings of the present invention.

It should then be appreciated that securement strap 88 and hangers 90 according to the teachings of the present invention are particularly advantageous. Storage batteries are generally located under the vehicle hoods in a generally cluttered area. Further, especially in modern automobiles, the hood is located closely adjacent to the top of the storage battery making any increase in battery height impossible. However, securement strap 88 and hangers 90 allow battery heater 18 to be retrofitted in existing automotive-type vehicles by mounting battery heater 18 to any exposed side of the storage battery and without generally increasing the overall size and height of the storage battery and battery heater 18. Further, securement strap 88 and hangers 90 are inexpensive to manufacture and assemble and are otherwise advantageous.

It should initially be noted that for maximum storage battery efficiency, an internal battery temperature of approximately 80° F. (26.7° C.) is required. However, precautions should be taken to prevent the internal battery temperature from exceeding 90° F. (32.2° C.). Further, cold spots are created by the varying rate of loss of heat at different locations around the casing of the storage battery and other factors. For example, casing seams, corners, and the like slow the rate of heat loss at those locations. Likewise, areas adjacent to the terminals are heated by delivery of electrical current by the alternator or the like. In particular, the bottom of the casing spaced from the corners is one cold spot and especially prone to heat loss due to its resting on a rigid metal surface. In fact, up to 90% of battery heat loss is believed to occur through the bottom of the storage battery.

Thermally insulating mat 12 is formed of a material which is pliable, does not become brittle under cold temperatures, includes no acid or plasticizers and that generally takes the temperature of the storage battery and not the battery platform. In its most preferred form, thermally insulating mat 12 is formed of neoprene rubber (85-95 Durometer EPDM). For example, if the storage battery rested upon material which was hard or included acids, the base of the storage battery may deform over time to that of the material or may soften possibly leading to the eventual deterioration of the storage battery itself. In the preferred embodiment, thermally insulating mat 12 is formed of a flat sheet 94 having a thickness in the range of 0.062 inches (0.157 cm) and including, integral, parallel, spaced ribs 96 on both sides of sheet 94 in an aligned condition. Ribs 96 should be no more than 1 inch (2.54 cm) apart and preferably are in the range of ¼ inch (0.635 cm) apart. In the most preferred form of the present invention, ribs 96 have a height equal to one-half the thickness of sheet 94 such that the combined thickness through ribs 96 and sheet 94 is equal to twice the thickness of sheet 94. Mat 12 has a size smaller than the base of the storage battery and for receipt under the storage battery such that the storage battery is separated from the metal battery platform standard in automotive-type vehicles by thermally insulating mat 12 and in the preferred form has dimensions in the range of 6⅛ inches (15.56 cm) by 8⅛ inches (20.64 cm). Thus, thermally insulating mat 12 elevates the storage battery from the standard metal battery platform and thus from the cold temperature thigmotropistic reactions of the rigid, metal platform. In addition to elevating the storage battery from the battery platform, ribs 96 allow for the creation of an air barrier between the storage battery and the battery platform. It should then be appreciated that the size of thermally insulating mat 12 smaller than the storage battery and the height of ribs 96 position the edges of the storage battery close enough to the battery platform to substantially prevent air flow between ribs 96 such that the air is dormant, i.e. generally trapped, between ribs 96 in thermally insulating mat 12. This trapping of air increases the insulative properties of the air barrier and thermally insulating mat 12. It should then be noted that although the periphery of the base of the storage battery is exposed to the battery platform, the increased thickness of the corners of the storage battery reduces heat loss while creating the trapped air barrier which significantly reduces heat loses through the cold spots of the base of the storage battery. Ribs 96 also allow for drainage of water adjacent to the battery platform.

Thermal cap 16 is formed of durable, pliable sheet material which forms a thermal barrier and in its most preferred form is formed of acid-resistant, sub-zero vinyl. In its most preferred form, cap 16 is formed in a rectangular sheet having a size to be wrapped around the top of the storage battery and specifically to cover the top and extend down to approximately one inch (2.54 cm) from the bottom of the battery or approximately 85% of the sides of the storage battery and in particular having dimensions in the range of 16 inches (40.6 cm) by 17½ inches (44.45 cm) and a thickness in the range of 0.02 inches (0.05 cm). During installation, suitable openings 98 may be provided allowing access to the terminals 98 of the storage battery and for connectors 60 of battery heater 18.

In its most preferred form, insulation blanket 14 is formed of air-barrier insulation 100 such as urethane-polyether open cell thermal artic foam insulation sandwiched between first and second layers 102 formed of durable, pliable sheet material that forms a thermal barrier such as acid-resistant, sub-zero vinyl. In the preferred embodiment, blanket 14 is generally T-shaped and includes a leg 104 and a head 106. In the preferred embodiment, leg 104 has a length to extend over the top of the storage battery and down substantially the height of two faces of the storage battery and in the preferred form has a length in the range of 22 inches (55.88 cm) and has a width allowing its positioning between connectors 60 of battery heater 18 and between the terminals of the storage battery and in the preferred form has a width in the range of 4 inches (10.16 cm). In the preferred embodiment, head 106 has a length to extend with a slight overlap around the circumference of the faces of the storage battery and in the preferred form has a length in the range of 36 inches (91.44 cm) and has a height to extend up to approximately 70% of the height of the storage battery to thereby allow connectors 60 to extend above head 106 when insulation blanket 14 is positioned on the storage battery and in the preferred embodiment has a height in the range of 5 inches (12.7 cm). In the preferred embodiment, an edge of thermal cap 16 is removably attached along head 106 of insulation blanket 14 such as by double sided adhesive tape 110 approximately ½ of the height of head 106.

Suitable means may be provided to removably secure thermal cap 16 and insulation blanket 14 to the storage battery. Specifically, in its most preferred form, an elastic securement strap 108 is provided concentrically with head 106 of insulation blanket 14 such that elastic securement strap 108 sandwiches insulation blanket 14 adjacent to the storage battery.

It can then be appreciated that thermally insulating mat 12, insulation blanket 14 and thermal cap 16 according to the teachings of the present invention are especially adaptable for retrofitting on automotive-type vehicles with standard storage batteries of varying sizes and varieties. Prior to the present invention, storage battery heating and heat maintenance apparatus were geared toward heavy equipment type applications and generally required specially manufactured storage batteries and/or specially designed battery receptacles or bags. Thus, such prior apparatus were not affordable or suitable to the average consumer of automotive products. Thermally insulating mat 12, insulation blanket 14 and thermal cap 16 according to the teachings of the present invention overcomes these disadvantages of prior apparatus and in addition are superior in their effectiveness.

Specifically, as set forth hereinbefore, the T-shape of insulation blanket 14 makes it particularly adaptable to be wrapped around different sizes and varieties of storage batteries including battery heater 18, if desired. It can then be appreciated that insulation blanket 14 overlies all of the cold spots of the sides and top of the storage battery which comprise major areas of heat loss of the storage battery. Thus, insulation blanket 14 adds an air insulation barrier between insulation blanket 14 and the storage battery, a first thermal wall by the inside layer 102, insulation 100, and a second thermal wall by the outside layer 102 to the cold spots of the sides and top of the storage battery, substantially reducing the heat loss through these cold spot areas of the storage battery. Thermal cap 16 adds an air insulation barrier between thermal cap 16 and the storage battery and a thermal wall to the portions of the storage battery not covered by insulation blanket 14 and thus reinforces the reduction of heat loss achieved by insulation blanket 14. Thus, thermally insulating mat 12, insulation blanket 14 and thermal cap 16 according to the teachings of the present invention may extend storage battery cool down by 12 to 16 hours.

It can then be appreciated that the three piece construction, i.e. thermally insulating mat 12, insulation blanket 14 and thermal cap 16, is particularly advantageous in allowing retrofit of heat maintenance apparatus 10 according to the teachings of the present invention. Furthermore, the three piece construction allows battery gases to escape. Towards that end, apertures may be provided in thermal cap 16 and under leg 104 of insulation blanket 14 to allow for escape of battery gases while maintaining an air insulation barrier against the storage battery.

It can also be appreciated that when battery heater 18 is located within insulation blanket 14 and thermal cap 16 according to the teachings of the present invention, a hot air cap or bubble is formed around the storage battery by insulation blanket 14 and thermal cap 16 which forms the air insulation barrier and captures the heat transferred by battery heater 18 therein. Thus, insulation blanket 14 and thermal cap 16 keep more heat in while heat is being transferred in by battery heater 18 according to the teachings of the present invention, instead of losing heat to the environment at the same time as heat transfer. This effect aids in battery warming and also delays heat loss when heat is not being introduced to the storage battery.

Assuming the storage battery has been removed from the battery platform, apparatus 10 according to the preferred teachings of the present invention may be installed in the following manner. Thermally insulating mat 12 may be positioned on the battery platform and then the storage battery may be positioned on mat 12. Battery heater 18 may then be secured to the storage battery such as by securement strap 88 and hangers 90 in the preferred embodiment. Openings 98, if not already present, may be cut in thermal cap 16 for the terminals of the storage battery and connectors 60 of battery heater 18. Thermal cap 16 may then be secured to insulation blanket 14 by tape 110. Insulation blanket 14 and thermal cap 16 may then be positioned on the storage battery such that head 106 extends up the faces of the storage battery from its base and circumferentially around the faces of the storage battery and such that leg 106 extends over the top of the storage battery between its terminals and down the opposite face and at least partially beneath the overlapping free ends of head 106. It can then be appreciated that thermal cap 16 is located beneath leg 104 and head 106 of insulation blanket 14 and is held in position thereby and also by tape 110. Insulation blanket 14 may then be secured to the storage battery such as by elastic securement strap 108 in the preferred embodiment. A battery terminal heater may be further installed such as the type shown and described in U.S. Pat. No. 4,600,665. Battery heater 18 and the battery terminal heater may then be connected to liquid cooling system 54 of an automotive-type vehicle and electric connections may be made to the terminals of the storage battery. Likewise, the storage battery may be suitably anchored to the battery platform.

Now that the basic teachings and preferred construction of the present invention has been set forth, further advantages and subtle features of the present invention can be set forth and appreciated. As set forth hereinbefore, the process of charging the storage battery may not deliver the necessary heat energy to the storage battery to maintain high efficiency. Therefore, to maintain the storage battery's cranking capacity, an additional source of heat for the storage battery may be provided. One such source is a battery terminal heater of the type shown and described in U.S. Pat. No. 4,600,665. Another heat source which may be utilized in addition to or apart from such a battery terminal heater or other heat source is battery heater 18 of storage battery heating and heat maintenance apparatus 10 according to the teachings of the present invention.

During operation of the automotive-type vehicle equipped with battery heater 18 of storage battery heating and heat maintenance apparatus 10 of the present invention, circulation of liquid coolant through heat exchanger 22 transfers heat thereto. Due to the abutting relationship of spreader plate 24 and heat exchanger 22, a relatively good thermal conductivity path through surface contact exists therebetween such that heat is transferred from heat exchanger 22 to spreader plate 24 and is spread over the entire area of spreader plate 24 and radiates therefrom.

It can then be appreciated that the two piece type of construction for the heat transfer means, i.e. heat exchanger 22 and spreader plate 24, is particularly advantageous. Specifically, the preferred construction is easy and inexpensive to manufacture and assemble. In particular, heat exchanger 22 formed from a single conduit is best able to withstand the fluid pressure of liquid cooling system 54 and is not prone to leak such as multicomponent heat exchangers which are also more expensive to manufacture. Without spreader plate 24, heat from heat exchanger 22 would unevenly heat the storage battery which is disadvantageous. Furthermore, due to the direct contact of heat exchanger 22 with spreader plate 24, a good thermal conductivity path exists to increase the radiant surface area of the heat transfer means of battery heater 18 of apparatus 10 according to the teachings of the present invention.

It should then be noted that the temperature of the liquid coolant of liquid cooling system is typically within the range of 180° F. (82.2° C.) which is significantly higher than the desired internal battery temperature desired. It is then necessary to reduce the heat transfer of battery heater 18 to approximately 90° F. (32.2° C.). This reduction in heat transfer is accomplished in battery heater 18 according to the teachings of the present invention by several, interacting constructional features. Specifically, ribs 76 hold spreader plate 24 away from surface 74 of back cover 26 creating an air insulation buffer therebetween. Further, the particular material from which unit base 20 and back cover 26 are formed and the thickness of bottoms 28 and 62 reduces the direct heat transfer from the heat transferring means to the storage battery. Furthermore, ribs 82 hold surface 72 from the face of the storage battery creating a second air insulation buffer between the heat transferring means and the storage battery. It should also be appreciated that an air insulation buffer is also created between heat exchanger 22 and surface 40 of unit base 20 by ribs 42, however ribs 42 have a lesser height than ribs 76 such that the heat transfer is reduced less as bottom 28 is not adjacent to the battery surface. Heat radiated through bottom 28 of battery heater 18 heats the air adjacent thereto which may be captured by insulation blanket 14 and thermal cap 16 in a manner set forth hereinbefore.

It can then be appreciated that while the engine is running, battery heater 18 of the present invention may deliver up to 120 watts of free heat to the storage battery without an external power source. Forty-five minutes to one hour of driving time with a warm engine is required per 24 hour period to have full cranking capacity of the storage battery at engine shutdown. Thus, battery heater 18 of the present invention delivers the necessary heat energy to the storage battery while the vehicle is in operation allowing the storage battery to collect a full electrical charge from the alternator and at the same time deliver a full thermal charge so that at engine shutdown, the storage battery is at its full electrical and thermal capacity, or 100% of its cold cranking capacity, depending on the length of vehicle operation.

Since a standard storage battery has a large heat capacity, the storage battery will lose heat generated by the process of charging the storage battery, from battery heater 18, from a battery terminal heater, or from other heat sources gradually and will maintain high efficiency operating temperatures for a significant period of time after the engine is off, thereby maintaining the storage battery in a higher operating efficiency than if the storage battery was at the temperature of the surrounding air. However, the rate of loss of heat may be greatly reduced or in other words the heat maintaining capability of the storage battery may be enhanced utilizing thermally insulating mat 12, insulation blanket 14, and thermal cap 16 of apparatus 10 according to the teachings of the present invention.

It should be then appreciated that storage battery heating and heat maintenance apparatus 10 according to the teachings of the present invention requires no daily maintenance as do traditional engine "add-on" devices and does not require electrical connection daily or between operation as the engine's own liquid cooling system 54 is utilized. Furthermore, storage battery heating and heat maintenance apparatus 10 according to the teachings of the present invention is adapted to universally fit automotive-type vehicle batteries in retrofit applications.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for maintaining heat for storage batteries, with the storage battery including a top, a bottom, and four faces, and with the storage battery including terminals, comprising, in combination: an insulation blanket, with the insulation blanket being T-shaped including a leg and a head, with the head having a first end and a second end, with the leg extending generally perpendicular to the head and having a first end connected to the head generally intermediate its ends and having a second end, with the head being pliable and having a length sufficient to be wrapped around the faces of the storage battery, with the leg being pliable and having a width less than the spacing between the terminals of the storage battery, with the leg having a length sufficient to extend between the terminals of the storage battery and over the top of the storage battery with the second end of the leg located intermediate the storage battery and the ends of the head in a wrapped condition; and means for holding the head in a wrapped condition around the faces of the storage battery.

2. The storage battery heat maintenance apparatus of claim 1 wherein the holding means comprises an elastic securement strap located concentrically with the head of the insulation blanket in a wrapped condition around the faces of the storage battery sandwiching the head adjacent to the storage battery.

3. The storage battery heat maintenance apparatus of claim 1 wherein the insulation blanket comprises, in combination: air barrier insulation sandwiched between first and second layers of thermal barrier material.

4. The storage battery heat maintenance apparatus of claim 3 further comprising, in combination: a thermal cap, with the thermal cap being formed of a sheet of thermal barrier material, with the thermal cap having a size sufficient to cover the top of the storage battery and extend down the faces of the storage battery to extend beneath the head of the insulation blanket in a wrapped condition around the faces of the storage battery and intermediate the head of the insulation blanket and the storage battery.

5. The storage battery heat maintenance apparatus of claim 4 wherein the thermal barrier material is acid-resistant, sub-zero vinyl.

6. The storage battery heat maintenance apparatus of claim 4 further comprising, in combination: means for removably securing the thermal cap to the head of the insulation blanket.

7. The storage battery heat maintenance apparatus of claim 4 wherein the storage battery is supported on a battery platform; wherein the intersection of the bottom and faces of the storage battery define bottom edges; and wherein the storage battery heat maintenance apparatus further comprises, in combination: a thermally insulating mat comprising a pliable, insulating sheet having integral ribs at least on one surface thereof, with the size of the thermally insulating mat being smaller than the bottom of the storage battery, with the thermally insulating mat being located intermediate the storage battery and the battery platform, with the thermally insulating mat being located inwardly of the bottom edges of the storage battery, with the pliability and thickness of the insulating sheet and integral ribs positioning the bottom edges of the storage battery from the battery platform substantially preventing air flow between the ribs and trapping air between the ribs to form an air barrier between the storage battery and the battery platform.

8. The storage battery heat maintenance apparatus of claim 7 wherein the integral ribs are formed on both surfaces of the pliable, insulating sheet of the thermally insulating mat, with the ribs adjacent to the battery platform allowing for drainage of water adjacent to the battery platform.

9. The storage battery heat maintenance apparatus of claim 8 wherein the pliable, insulation sheet of the thermally insulating mat has a thickness; wherein the integral ribs are aligned on the opposite sides of the pliable, insulation sheet of the thermally insulating mat; and wherein the integral ribs have a height equal to one half of the thickness of the pliable, insulation sheet of the thermally insulating mat.

10. The storage battery heat maintenance apparatus of claim 7 wherein the thermally insulating mat is formed of material free of acids and plasticizers which may deform or soften the bottom of the storage battery, with the thermally insulating mat being formed of 85–95 Durometer EPDM.

11. The storage battery heat maintenance apparatus of claim 7 further comprising, in combination: apparatus for heating the storage battery comprising, in combination: a battery heater; and means for removably securing the battery heater to one of the faces of the storage battery.

12. The storage battery heat maintenance apparatus of claim 11 wherein the battery heater securing means comprises, in combination: Z-shaped hangers having a first end and a second end, with the first ends of the hangers interconnected to the battery heater, with the second ends of the hangers resting on the top of the storage battery; a securement strap extending around the faces of the storage battery, with the battery heater located intermediate the securement strap and the storage battery; and means for interconnecting the battery heater to the securement strap.

13. The storage battery heat maintenance apparatus of claim 11 wherein the battery heater comprises, in combination: means for applying heat to the storage battery, with the heat applying means including a heat exchanger and means for connecting the heat exchanger to a liquid cooling system of an automotive-type vehicle; and means for reducing the heat transfer of the heat exchanger from the temperature of the liquid cooling system of the automotive-type vehicle.

14. The storage battery heat maintenance apparatus of claim 13 wherein the reducing means comprises, in combination: a back cover for receipt of the heat applying means, with the back cover located intermediate the face of the storage battery and the heat applying means; first means for creating an air insulation buffer between the back cover and the storage battery; and second means for creating an air insulation buffer between the heat applying means and the back cover.

15. The storage battery heat maintenance apparatus of claim 14 wherein the reducing means further comprises, in combination: a unit base having a size and shape complementary to the back cover; means for securing the unit base to the back cover to enclose the heat applying means therein; and third means for creating an air insulation buffer between the heat applying means and the unit base.

16. The storage battery heat maintenance apparatus of claim 15 wherein the back cover and the unit base are formed of material having excellent thermal holding ability and which will allow a slow radiation of heat; wherein the first air insulation buffer creating means comprises vertically-oriented ribs formed on the back cover for abutting with the storage battery; wherein the second air insulation buffer creating means comprises first and second horizontal ribs formed on the back cover for abutting with the heat applying means; and wherein the third air insulation buffer creating means comprises first and second horizontal ribs formed on the unit base for abutting with the heat applying means.

17. The storage battery heat maintenance apparatus of claim 15 wherein the back cover is telescopically received in the unit base; wherein the heat applying means comprises, in combination: a heat exchanger having a generally W configuration, and a spreader plate formed of material for receiving heat from the heat exchanger and radiating the heat over its entire area, with the spreader plate being intermediate the storage battery and the heat exchanger; and wherein the securing means comprises, in combination: studs extending from the unit base, studs extending from the back cover complementary to the studs of the unit base, attachment means extending through the studs of the back cover and into the studs of the unit base, with the heat exchanger straddling the studs of the back cover and the unit base, and means for strengthening the studs of the unit base such that the back cover is pulled toward the unit base by the attachment means to insure that the heat exchanger is pulled snugly against the spreader plate establishing a thermal conductivity path therebetween.

18. The storage battery heat maintenance apparatus of claim 13 wherein the connecting means comprises first and second connectors, with the width of the leg of the insulation blanket being less than the spacing between the first and second connectors of the heat exchanger of the battery heater.

19. Apparatus for maintaining heat for storage batteries supported on a battery platform, with the storage battery including a bottom and faces intersecting at bottom edges, comprising, in combination: a thermally insulating mat comprising a pliable, insulating sheet having integral ribs at least on one surface thereof, with the size of the thermally insulating mat being smaller than the bottom of the storage battery, with the thermally insulating mat being located intermediate the storage battery and the battery platform, with the thermally insulating mat being located inwardly of the bottom edges of the storage battery, with the pliability and thickness of the insulating sheet and integral ribs positioning the bottom edges of the storage battery from the battery platform substantially preventing air flow between the ribs and trapping air between the ribs to form an air barrier between the storage battery and the battery platform.

20. The storage battery heat maintenance apparatus of claim 19 wherein the integral ribs are formed on both surfaces of the pliable, insulating sheet of the thermally insulating mat, with the ribs adjacent to the battery platform allowing for drainage of water adjacent to the battery platform.

21. The storage battery heat maintenance apparatus of claim 20 wherein the pliable, insulation sheet of the thermally insulating mat has a thickness; wherein the integral ribs are aligned on the opposite sides of the pliable, insulation sheet of the thermally insulating mat; and wherein the integral ribs have a height equal to one half of the thickness of the pliable, insulation sheet of the thermally insulating mat.

22. The storage battery heat maintenance apparatus of claim 19 wherein the thermally insulating mat is formed of material free of acids and plasticizers which may deform or soften the bottom of the storage battery.

23. Apparatus for heating a storage battery, with the storage battery including a face, comprising, in combination: a battery heater; and means for removably securing the battery heater to the face of the storage battery; wherein the battery heater comprises, in combination: means for applying heat to the storage battery, with the heat applying means including a heat exchanger and means for connecting the heat exchanger to a liquid cooling system of an automotive-type vehicle; and means for reducing the heat transfer of the heat exchanger from the temperature of the liquid cooling system of the automotive-type vehicle; wherein the reducing means comprises, in combination: a back cover for receipt of the heat applying means, with the back cover located intermediate the face of the storage battery and the heat applying means; first means for creating an air insulation buffer between the back cover and the storage battery; and second means for creating an air insulation buffer between the heat applying means and the back cover.

24. The storage battery heating apparatus of claim 23 wherein the reducing means further comprises, in combination: a unit base having a size and shape complementary to the back cover; means for securing the unit base to the back cover to enclose the heat applying means therein; and third means for creating an air insulation buffer between the heat applying means and the unit base.

25. The storage battery heating apparatus of claim 24 wherein the back cover and the unit base are formed of material having excellent thermal holding ability and which will allow slow radiation of heat; wherein the first air insulation buffer creating means comprises vertically-oriented ribs formed on the back cover for abutting with the storage battery; wherein the second air insulation buffer creating means comprises first and second horizontal ribs formed on the back cover for abutting with the heat applying means; and wherein the third air insulation buffer creating means comprises first and second horizontal ribs formed on the unit base for abutting with the heat applying means.

26. The storage battery heating apparatus of claim 24 wherein the back cover is telescopically received in the unit base; wherein the heat applying means comprises, in combination: a heat exchanger having a generally W configuration, and a spreader plate formed of material for receiving heat from the heat exchanger and radiating the heat over its entire area, with the spreader plate being intermediate the storage battery and the heat exchanger; and wherein the securing means comprises, in combination: studs extending from the unit base, studs extending from the back cover complementary to the studs of the unit base, attachment means extending through the studs of the back cover and into the studs of the unit base, with the heat exchanger straddling the studs of the back cover and the unit base, and means for strengthening the studs of the unit base such that the back cover is pulled toward the unit base by the attachment means to insure that the heat exchanger is pulled snugly against the spreader plate establishing a thermal conductivity path therebetween.

27. Apparatus for heating a storage battery, with the storage battery including a face, comprising, in combination: a battery heater; and means for removably securing the battery heater to the face of the storage battery; wherein the battery heater comprises, in combination: means for applying heat to the storage battery, with the heat applying means including a heat exchanger and means for connecting the heat exchanger to a liquid cooling system of an automotive-type vehicle; and means for reducing the heat transfer of the heat exchanger from the temperature of the liquid cooling system of the automotive-type vehicle; wherein the battery heater securing means comprises, in combination: Z shaped hangers having a first end and a second end, with the first ends of the hangers interconnected to the battery heater, with the second ends of the hangers resting on the top of the storage battery; a securement strap extending around the faces of the storage battery, with the battery heater located intermediate the securement strap and the storage battery; and means for interconnecting the battery heater to the securement strap.

* * * * *